April 9, 1963 C. C. WAUGH 3,084,545
CONSTRUCTION FOR PREVENTING BEARING CONTAMINATION
Filed Dec. 7, 1959 2 Sheets-Sheet 1

INVENTOR.
CHARLES C. WAUGH
BY
ATTORNEY.

April 9, 1963  C. C. WAUGH  3,084,545
CONSTRUCTION FOR PREVENTING BEARING CONTAMINATION
Filed Dec. 7, 1959  2 Sheets-Sheet 2
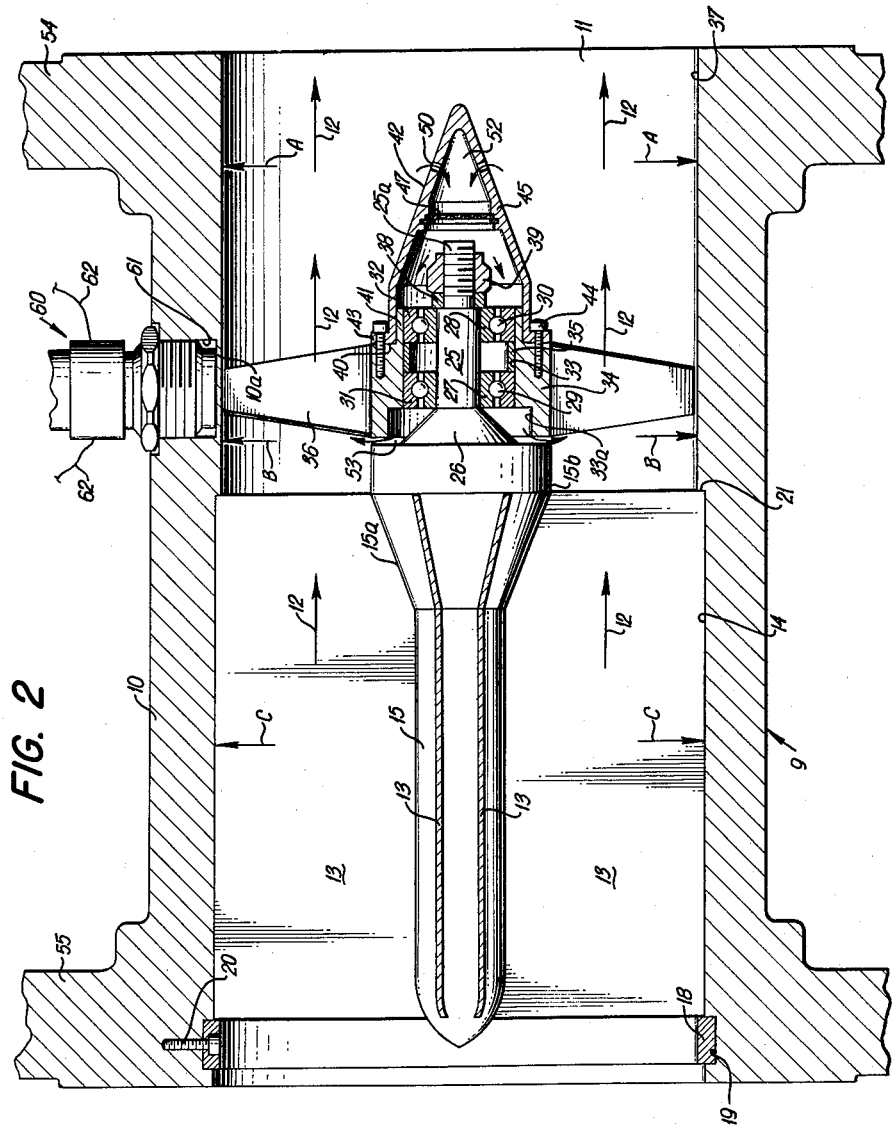
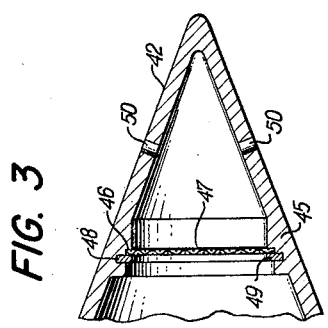
INVENTOR.
CHARLES C. WAUGH
BY
R. E. Geangue
ATTORNEY.

United States Patent Office 3,084,545
Patented Apr. 9, 1963

3,084,545
CONSTRUCTION FOR PREVENTING BEARING CONTAMINATION
Charles C. Waugh, Van Nuys, Calif., assignor to The Foxboro Company, a corporation of Massachusetts
Filed Dec. 7, 1959, Ser. No. 857,937
12 Claims. (Cl. 73—231)

This invention relates to a construction for preventing bearing contamination and more particularly, to a bearing construction located in a fluid passage for preventing contamination of bearings which mount the turbine rotor of a turbine flow meter.

When turbine flow meters are utilized to meter the flow of dirty liquids such as crude oil, the bearings are subjected to the liquid and collect dirt and other contamination from the liquid. The dirt, of course, causes excessive and uneven wear of the bearings and increases the drag on the turbine rotor so that the accuracy of the flow meter is affected. The present invention provides a construction for maintaining the bearings free of such dirt by first filtering a small amount of the liquid and then passing this liquid over the bearings and back into the flow stream. A difference in static pressure of the liquid exists along the axis of the flow meter since the hub of the turbine rotor is of greater diameter than the supporting bullet and tail cone. This difference in static pressure is utilized to cause liquid to flow upstream from the tail cone through the ball bearings located in the hub of the rotor and back into the flow stream at a location adjacent to the hub. A filter screen is located in this secondary flow path in order to remove dirt and other contamination from the liquid which is caused to flow over the bearings. Therefore, the bearings are maintained in good condition and free from contamination regardless of the fact that the flow rate of a dirty liquid is being measured.

It is therefore an object of the present invention to provide a construction for protecting bearings which consists of a secondary flow passage passing over the bearings and containing a filter, the flow through said passage resulting from a static pressure difference.

Another object of the invention is to provide a construction for protecting the bearings of a turbine flow meter, which construction comprises a secondary flow path containing a filter and connecting with points in the flow stream of different static pressure.

These and other objects of the invention not specifically set forth above will become readily apparent from the accompanying description and drawings in which:

FIGURE 2 is a view similar to FIGURE 1 showing in section the bearing support for the turbine rotor and the secondary flow passage.

FIGURE 3 is an enlarged sectional view of a portion of the tail cone shown in FIGURE 2.

Figures 1, 4, 5:
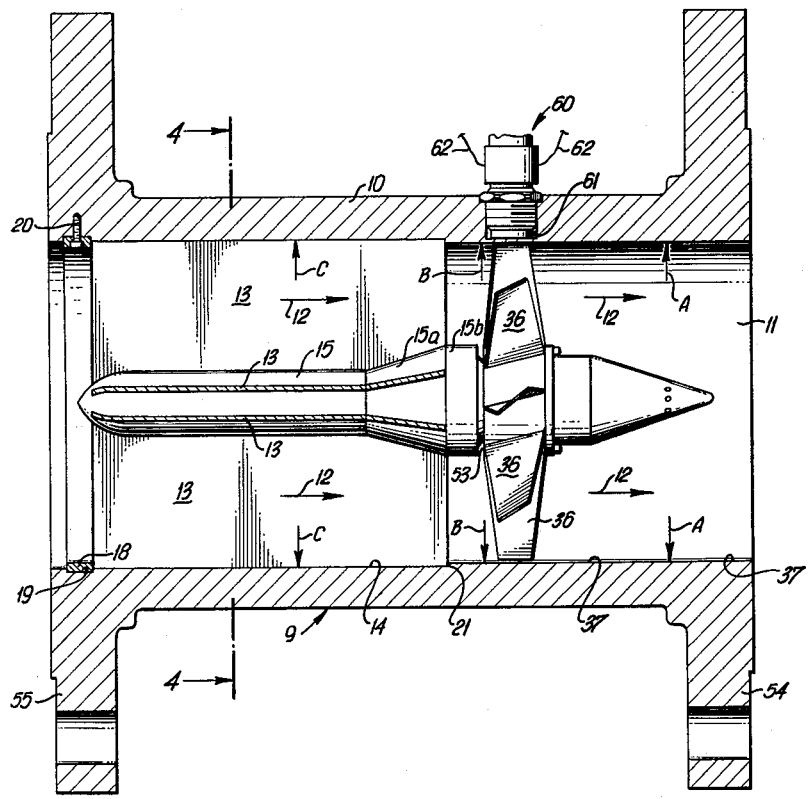
FIGURE 1 is a sectional view of a turbine flow meter illustrating the turbine rotor and support therefor in elevation.
FIGURE 4 is a transverse section along line 4—4 of FIGURE 1 illustrating the turbine blades and the supporting structure for the rotor.
FIGURE 5 is a sectional view of a modification of the tail cone which is constructed of sintered metal.

The embodiment of the invention illustrated in FIGURES 1 and 2 comprises a flow meter 9 having a casing 10 containing a flow passage 11 through which liquid flows in the direction of the arrows 12. Six vanes or struts 13 are connected with a bullet member 15 in order to support the member 15 centrally within the passage 11. The outer edges of the struts 13 rest against the inner surface 14 of the casing 10 (see FIGURE 4) and a retaining ring 18 is secured in groove 19 by bolt 20 in order to retain the struts 13 in abutment against the shoulder 21. The bullet member 15 has a tapered portion 15a terminating in an enlarged cylindrical portion 15b located beyond the ends of struts 13. A turbine shaft 25 has a tapered end 26 secured to portion 15b. The shaft mounts inner races 27 and 28 for ball bearings 29 and 30, respectively. The outer races 31 and 32 for the ball bearings 29 and 30, respectively, are spaced apart by ring 35 and are located in center opening 33 of turbine rotor hub 34 in order to support the turbine rotor for rotation about the axis of shaft 25. The hub 34 supports a plurality of radially extending helical blades 36 which terminate closely adjacent to the inner surface 37 of the passage 11.

End 25a of shaft 25 is threaded and receives a thrust plate 38 secured by a lock nut 39. The center opening 33 in hub 34 is enlarged at portion 33a and the outer circumference is reduced at step 40 to form an extension 41. A tail cone 42 has a base ledge 43 which is secured to step 40 of the rotor hub by a plurality of bolts 44 and the internal diameter of the base of the tail cone snugly receives the extension 41. An enlarged wall portion 45 of the tail cone contains a step portion 46 (see FIGURE 3) for receiving a filter 47 and a groove 48 receives a retaining ring 49 to hold the filter 47 in location. The nose portion of the tail cone contains a plurality of openings 50 which connect the liquid at station A within the passage 11 with the space 52 inside the hollow tail cone 42. It is apparent that the openings 50, the space 52, the space between the bearing races, and space 53 between bullet portion 15b and hub 34 define a secondary fluid passage for communicating between stations A and B in the passage 11. It is understood that casing 10 can be supported in any desired manner by end flanges 54 and 55 so that the passage 11 can become a part of any fluid conduit in which it is desired to measure fluid flow.

As fluid flows through the passage 11 in the direction of the arrows 12, the fluid will develop a torque upon the blades 36 which will cause rotation of the blades, the rotor hub 34 and the nose cone 42, all of which are supported upon shaft 25 by bearings 29 and 30. The total pressure of the fluid in flowing through passage 11 remains substantially constant and there will be an increase of velocity pressure between stations C and B because of the enlargement of the bullet portion 15b. Also, there will be a reduction in velocity of the flow from station B to station A because of the taper of the tail cone 42 and thus, the static pressure at station A will be greater than at station B. The large size of the bullet portion 15b and of the rotor hub 34 results from the fact that the blades are as short as possible to have maximum strength and still provide the desired blade area.

The fluid flowing through the passage 11 will cause rotation of the blades at a speed which is proportional to the volume of fluid flowing through the passage. In order to sense the speed of the rotor and therefore obtain an indication of volume flow, a magnetic pickup 60 is threaded into an opening 61 in the casing 10. This pickup produces a magnetic field through a thin casing section 10a, and the field is influenced by each blade 26 as it moves past the pickup 60 in order to produce a signal in the leads 62. In general, the pickup comprises a permanent magnet surrounded by a coil and disruption of the magnetic field by each blade produces a pulse in the coil. Since the casing 10 is constructed of a non-magnetic stainless steel the presence of the portion 10a will not affect the field of the pickup 60. By counting the individual pulses produced by the blades moving past the pickup 60, the speed of rotation of the turbine and the volume flow through the passage 11 can be determined. It is pointed out that the pickup 60 is of standard design and that other types of pickups, such as light-sensitive devices, can be utilized.

Because the static pressure is higher at station A than at station B, there will be a continuous flow of fluid from passage 11 through openings 50 and back to passage 11 through space 53. The volume of this flow will, of course, depend upon the size of openings 50 and of space 53. Since the fluid must flow through the filter 47, all foreign matter in the fluid will be removed before it flows over the bearings 29 and 30 and the bearings will therefore not become contaminated. It is apparent that the filtered flow over the bearings does not require a separate pumping device since the difference in static pressure present within the casing 10 is utilized and thus, the protection of the bearings is provided without the provision of special equipment for this purpose. It is understood that portion 15b and hub 34 can be of different sizes so long as space 53 opens into a station B of lower static pressure than station A.

A modification of the invention is illustrated in FIGURE 5 wherein the tail cone 42a is fabricated of a sintered metal which has sufficient porosity to permit fluid flow therethrough. In fabricating the tail cone 42a, a sintered metal is machined into the final shape of the tail cone and during the course of the machining the total surface, both interior and exterior, will be closed to fluid flow. Thereafter, the surfaces of the nose portion 50a are etched to open up the pores of the metal and permit fluid flow through this etched portion. Thus, the etched nose portion 50a takes the place of the openings 50 in the prior embodiment and permits fluid flow to the interior space 52 and over the bearings in the same manner as in the previous embodiment. Since the fluid is filtered in flowing through the nose portion 50a, there is no necessity for an additional filter in the secondary flow passage, and since the cone 42a can be fabricated in very small sizes, it would be particularly suitable for extremely small flow meters. Flanges 43a serve to mount the tail cone 42a on the rotor hub 34 by means of bolts 44. It is understood that the etched portion 50a must be at the nose of the tail cone 42a in order to maintain a static pressure difference along the length of the tail cone.

By the present invention, a construction has been provided for protecting the bearings of a turbine flow meter but it is apparent that the invention is applicable to the protection of bearings in any flow path, either liquid or gas, in which a difference in static pressure exists between opposite sides of the bearings. Also, it is apparent that the invention is applicable to various types of bearing constructions in which the bearings are secured in various ways to the relative rotating parts. Various other modifications are contemplated by those skilled in the art without departing from the spirit and scope of the invention as hereinafter defined by the appended claims.

What is claimed is:

1. In a turbine flow meter, a bullet member centrally supported within a flow passage and having an enlarged downstream end portion, a support shaft projecting from said enlarged end portion, a rotor hub displaced downstream from said enlarged end portion and surrounding said shaft, a discharge space located between said enlarged end portion and said rotor hub, ball bearing means located between said shaft and said rotor hub for rotatively supporting said rotor hub, a hollow tail cone secured at its base to the downstream side of said rotor hub and covering said bearing means, and inlet means located in the nose portion of said tail cone at a location smaller in transverse section than said enlarged end portion for providing secondary fluid flow from said flow passage through said tail cone, over said bearing means and through said discharge space resulting from the difference in static pressure at said inlet means and said discharge space, the secondary flow leaving said tail cone being filtered to prevent contamination of said bearing means.

2. In a turbine flow meter as defined in claim 1 having a filter extending across the hollow interior of said tail cone at a location in said secondary flow upstream of said bearing means.

3. In a turbine flow meter as defined in claim 1 wherein said inlet means comprises a porous nose portion for passing fluid through said tail cone and simultaneously filtering same.

4. In a turbine flow meter as defined in claim 1 wherein said bearing means comprises two sets of ball bearings spaced apart along said support shaft, each set of ball bearings having an inner race supported by said shaft and an outer race supporting said hub.

5. A construction for protecting bearings located in a fluid flow passage comprising, a stationary member, a rotatable member concentrically positioned about a shaft supported longitudinally within said passage by said stationary member, bearing means located between said rotatable member and said shaft, separate means located adjacent said rotatable member on the upstream and downstream sides thereof and being of different areas transverse of said flow passage for producing an increase in static pressure of the fluid across said bearing means in the downstream direction, and filtered passage means connecting across the static pressure difference and containing said bearing means for providing a secondary upstream flow of filtered fluid through said bearing means to prevent contamination of said bearing means, said filtered fluid being withdrawn from said flow passage downstream of said rotatable member and returned to said flow passage upstream of said rotatable member after flow through said filtered passage.

6. A construction for protecting bearings located in a fluid flow passage comprising a stationary member and a rotatable member concentrically positioned about a shaft carried by such stationary member, bearing means located between said rotatable member and said shaft, separate means located adjacent said rotatable member on the upstream and downstream sides thereof, the upstream means being of larger area transverse of said fluid flow passage than said downstream means for producing a difference in static pressure of the fluid across said bearing means resulting from increasing static pressure in the downstream direction of flow in said fluid flow passage, and filter passage means containing said bearing means and connecting across said static pressure difference for providing a secondary flow of filtered fluid withdrawn from said fluid flow passage and flowing through said bearing means in a direction opposite to the fluid flow in said flow passage to prevent contamination of said bearing means.

7. A construction as defined in claim 6 wherein said downstream means comprises a hollow member connected to said rotatable member and containing fluid inlet means for said filter passage means, the transverse area of said hollow member at said inlet means being less than the transverse area of said rotatable member.

8. A construction as defined in claim 7 having a filter in said hollow member and located across said filter passage means between said fluid inlet means and said bearing means.

9. A construction as defined in claim 7 wherein said upstream means comprises a portion of said stationary member of larger transverse area than the transverse area of said downstream means at the location of said fluid inlet means, said portion being spaced from said rotatable member to provide a discharge outlet for fluid leaving said filter passage means.

10. A construction for preventing bearing contamination comprising a support shaft positioned longitudinally within a fluid conduit, a rotatable hub surrounding said support shaft and having a circular exterior surface, bearing means located between said shaft and said rotatable hub, blade means carried by said hub and cooperating with the fluid flow in said conduit to rotate said rotatable hub, cylindrical support means for said shaft of substantially the same exterior diameter as said rotatable hub and spaced from one end of said rotatable hub to provide a discharge space, a hollow tapered member of varying circular cross sections having its base secured to the other end of said rotatable hub for enclosing one side of said bearing means, an inlet means in said tapered member on a diameter smaller than the exterior diameter of said support means for providing secondary fluid flow from said fluid conduit through said tapered member, over said bearing means and through said discharge space resulting from the difference in static pressure at said discharge space and said inlet means, said tapered member including a filter for filtering the secondary flow leaving said tapered member to prevent contamination of said bearing means.

11. A construction as defined in claim 10 wherein said filter is located within said tapered member between said inlet means and said bearing means.

12. A construction as defined in claim 10 wherein said tapered member is constructed of porous material, the pores in the smaller diameter end of said tapered member being open to provide said filter and the remaining pores being sealed at the surface of the tapered member.

References Cited in the file of this patent

UNITED STATES PATENTS

| | | |
|---|---|---|
| 808,150 | Fristoe | Dec. 26, 1905 |
| 2,529,481 | Brewer | Nov. 14, 1950 |
| 2,709,366 | Potter | May 31, 1955 |
| 2,749,842 | Angell et al. | June 12, 1956 |
| 2,803,194 | Johnson et al. | Aug. 20, 1957 |
| 2,812,661 | Cox | Nov. 12, 1957 |